J. C. HENDRY.
Hub-Attaching Device.

No. 202,726. Patented April 23, 1878.

Witnesses:
W. C. McArthur
C. L. Evert

Inventor:
John. C. Hendry,
per
Alexander & Elliott,
Attorneys.

UNITED STATES PATENT OFFICE.

JOHN C. HENDRY, OF BOSTON, MASSACHUSETTS.

IMPROVEMENT IN HUB-ATTACHING DEVICES.

Specification forming part of Letters Patent No. 202,726, dated April 23, 1878; application filed October 11, 1877.

*To all whom it may concern:*

Be it known that I, JOHN C. HENDRY, of Boston, in the State of Massachusetts, have invented certain new and useful Improvements in Vehicle-Hubs; and I do hereby declare that the following is a full, clear, and exact description thereof, reference being had to the accompanying drawings, and to the letters of reference marked thereon, which form part of this specification.

My present invention relates to vehicle-hubs; and it consists in certain improvements upon Letters Patent No. 178,772, granted to me June 13, 1876, as will be hereinafter more fully set forth.

In order to enable others skilled in the art to which my invention appertains to make and use the same, I will now proceed to describe its construction and operation, referring to the annexed drawings, in which—

Figure 1:
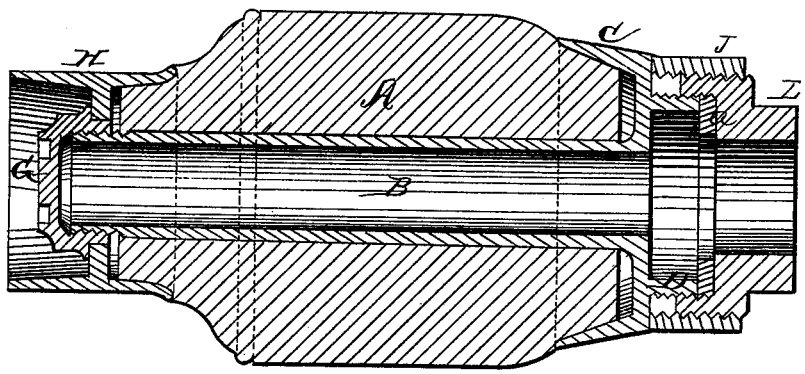
Figure 2:
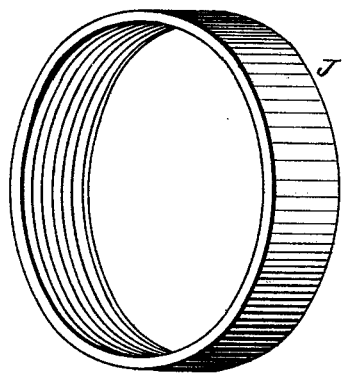
Figure 3:
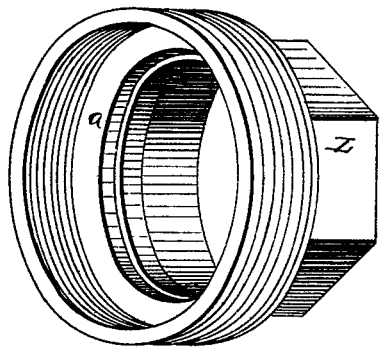

Figure 1 is a longitudinal section of my vehicle-hub embodying my present invention. Figs. 2 and 3 are detailed views of the double nut at the inner end of the hub.

A represents the ordinary wooden hub, with axle-box B, said box being at its inner end formed with the cap C, and on said end with a projecting annular flange, D, having exterior screw-threads. On the outer end of the hub is the metallic band H, and G is the nut screwed upon the outer end of the box B.

The above parts are all constructed substantially in the manner as described in my former patent above referred to.

The usual collar upon the axle lies within the annular flange D, and the axle held in place in the hub by means of a nut screwed on said flange. In the present case I construct this nut of two parts, viz: an outer ring, J, with a thread on its inside, and the nut proper, L, which latter contains the leather washer *a*. The nut L has a thread on its outside to fit and screw into the ring J, and also a different thread on its inside, which screws on the outside of the flange D; or it may be screwed on the inner end of the box, if the same be properly constructed for such purpose.

The nut thus constructed in two parts is adjustable, and is designed to prevent rattling of the wheel in case the leather washers get worn, as the entire nut can be detached from the hub, and the part L containing the washer can be screwed farther into the outer ring J, sufficiently to overcome the wear of the washer, and the entire nut then replaced on the hub.

There being two different threads on the part L, as shown, when the nut is screwed on the hub and the outer ring J comes firmly into place the part L of the nut containing the washer cannot be forced farther into the outer ring.

Having thus fully described my invention, what I claim as new, and desire to secure by Letters Patent, is—

In a vehicle-hub, the adjustable nut composed of the outer ring J, having interior threads, and the part L, having interior and exterior threads of different pitch, substantially as and for the purposes herein set forth.

In testimony that I claim the foregoing as my own I affix my signature in presence of two witnesses.

JOHN C. HENDRY.

Witnesses:
CHAS. H. GARLAND,
GEORGE E. BATES.